3,058,899
POLYMERIZATION OF VINYL COMPOUNDS
William H. Yanko and John D. Calfee, Dayton, Ohio, assignors to Monsanto Chemical Company, St. Louis, Mo., a corporation of Delaware
No Drawing. Filed Oct. 31, 1952, Ser. No. 318,098
4 Claims. (Cl. 204—158)

This invention relates to the polymerization of ethylenically unsaturated organic compounds, i.e., compounds containing a

group. In preferred aspects the invention pertains to the conjoint utilization of high pressure and of ionizing radiation to effect polymerization. In preferred embodiments, ethylenically unsaturated compounds are polymerized at high pressures in the presence of gamma-radiation derived from radioactive material.

The art of polymerizing ethylenically unsaturated organic compounds is an old one. Usually the polymerization is accomplished through the agency of added catalysts and an almost unlimited variety of products is obtainable by suitable selection of monomers or mixtures of monomers, catalysts, and reaction conditions. Among the polymers enjoying the most widespread commercial use are polystyrene, polyvinyl chloride, rubbery polymers of butadiene particularly copolymerized with styrene or acrylonitrile, and polyethylene. A host of other polymers can be named by those acquainted with this art. While the normally solid polymers are probably used to the largest extent, there are many uses for normally liquid polymers. Thus, for example liquid polybutadiene (having the nature of drying oil) can be used alone or in conjunction with natural drying oils for many purposes.

In many instances, the properties of a vinyl polymer are adversely affected by catalyst residues. This is particularly true when the polymer is employed as a dielectric. Often the stability of a polymer towards color formation, hazing, and other deterioration is adversely affected by the presence of catalyst residues. Further, the rate of reaction, extent of conversion, or character of polymerization, may leave something to be desired when using any particular catalyst. Hence the need for a process which can overcome any of the foregoing difficulties.

It is well-known that ionizing radiations can in some instances cause polymerization. Much research has been done on this subject matter and numerous monomer systems have been tried. X-rays, gamma-rays, α-radiation, β-radiation and silent electrical discharges have all been studied as possible sources for ionizing radiation to aid in polymerizations. To the best of our knowledge no practical application resulted. One reason is undoubtedly the fact that the energy utilization is quite low. This energy utilization can be expressed as $M/N$ wherein $M$ is number of molecules reacted and $N$ is number of ion pairs formed by the radiation in question. Even though a rather arbitrary assumption be made of the number of electron volts energy absorbed to give one ion pair formation, it is convenient to give $M/N$ values because most of the earlier work on reactions effected by ionizing radiation was reported in terms of $M/N$. The numerical representation of $M/N$ is based upon a theory of ion pair formation but is directly related to $G$, which is number of molecules reacted per 100 electron volts of energy absorbed by the reaction mixture. In the calculations of $M/N$ values given herein, it is assumed that one ion pair formation occurs per 33⅓ electron volts energy absorbed. Thus, $M/N$ is number of molecules reacted per 33⅓ electron volts absorbed and $G$ is number of molecules reacted per 100 electron volts absorbed. On this basis, $G=3(M/N)$.

It is an object of this invention to polymerize ethylenically unsaturated compounds. Another object is to produce polymers not contaminated with catalyst residues. A further object is to provide a new process for polymerizing normally gaseous ethylenically unsaturated compounds. Another object is to produce high molecular weight normally solid polymers. A further object is to utilize ionizing radiation, to effect polymerization in a manner resulting in a high ratio of molecules reacted per unit of energy absorbed by the reaction mixture. Another object is to provide a method of producing normally solid polyethylene. Another object is to polymerize 1-chloro-1-fluoroethylene. A further object is to employ radioactive substances effectively in the polymerization of ethylenically unsaturated organic compounds. A still further object is to obtain efficient utilization of the energy of gamma-radiation in polymerization processes. Other objects and advantages of the invention will be apparent, to those skilled in the art, from the accompanying disclosure and discussion.

In accordance with preferred embodiments of our invention, one or more of the foregoing objects are attained by subjecting an ethylenically unsaturated compound to polymerization at a pressure of at least 1,000 pounds per square inch under the influence of ionizing radiation of polymerizing intensity. For example, a normally gaseous monomer, e.g., ethylene, is subjected to the influence of gamma-radiation arising from a radioactive substance, while at a high pressure of at least 1,000 pounds per square inch and preferably at least 20,000 pounds per square inch. In this manner it is unnecessary to add any extraneous material to the reaction mixture for the purpose of catalyzing the polymerization, although in its broadest aspects the present invention does not exclude the presence of catalytic materials either deliberately or fortuitously present in the reaction mixture. Thus, a catalyst, for example oxygen, may accelerate the reaction being effected by the process of the invention, which however can be carried out in the absence of oxygen or any other catalytic material. Further, we have very unexpectedly discovered that the efficiency of utilization of the energy of the gamma- or other ionizing radiation is tremendously greater when operated in conjunction with high pressures than has hitherto been reported in the numerous investigations carried out at ordinary pressures of about atmospheric and below. Thus, the art reports $M/N$ values in the neighborhood of from one to 5,000 for polymerizations effected by ionizing radiation. In contrast, and as will be shown in detail hereinbelow by specific examples, we obtained for example in the polymerization of ethylene at high pressures under the influence of gamma-radiation from cobalt-60, $M/N$ values in the neighborhood of $1 \times 10^7$. At the present time the reasons for this remarkable difference are not understood, but regardless of any theories it is apparent the invention provides a polymerization process of great present and potential value.

The preferred form of radiation is gamma-radiation obtained from radioactive materials. One very convenient form is cobalt-60, which can be readily obtained by subjecting ordinary cobalt-59 metal to irradiation in an atomic pile. Cobalt-60 has a half-life of 5.3 years, and emits gamma-radiation of 1.33 and 1.17 mev. (million electric volts). Another example of a suitable and convenient source of gamma-radiation for carrying out the present invention is tantalum-182, having a half-life of 117 days, and gammas of 1.22, 1.13, 0.22 and 0.15 mev. Tantalum-182 of course provides a high specific gamma flux but its short half-life is a disadvantage requiring re-irradiation in the pile every few months. Numerous other gamma-emitting radio-isotopes available from chain reacting piles and cylotrons can also be used. Other materials providing gamma-radiation are available as naturally occurring materials, e.g., potassium-40, bismuth-214, protactinium-234, thallium-208, and lead-211. Choice of a particular source of gamma-radiation will depend upon availability, expense, intensity, and convenience of handling. A 50-millicurie source of cobalt-60 was used by us in obtaining the particular data set forth hereinbelow, and proved to be sufficiently intense to give excellent results. Sources of lower or much higher intensity can also be used, for example sources up to 10 kilocuries can be conveniently handled with proper facilities.

Of course, all necessary safety precautions must be used in handling radioactive material or in utilizing any source of radiation to carry out the process of this invention. Suitable techniques are now well-known and readily available.

A less preferred but suitable source of radiation for use in accordance with this invention is an X-ray generator. However, the mechanical problems of subjecting monomers under high pressure to the action of X-rays are in most instances more difficult than those encountered with radioactive substances.

While we consider that the employment of $\alpha$-radiation and $\beta$-radiation are within the purview of our invention in its broadest aspects, they are presently considered to be much less preferred than gamma- or X-ray radiation. Thus, broadly stated our invention involves the high pressure polymerization of ethylenically unsaturated compounds under the influence of ionizing radiation, which however is preferably electromagnetic radiation of high frequency not deflected by electric or magnetic fields and of great penetrative value, e.g. gamma-rays and X-rays.

While some valuable effect is obtained at pressures of 1,000 pounds per square inch absolute, we prefer to use a pressure of at least 5,000 pounds per square inch and preferably at least 20,000 pounds per square inch. At such pressures, without the benefit of our invention, the use of added materials such as catalysts presents serious problems. Although a relatively small amount of catalyst is needed when polymerizing at high pressure, yet this greatly increases the difficulty of control and particularly so since pressure polymerizations are very sensitive and one can easily obtain too sudden a reaction. Thus, the problems of controlling catalyst concentration, rate of catalyst addition, and temperature build-up which are extremely troublesome in high pressure polymerizations, are eliminated by the practice of our invention. By simple mechanical means the intensity of radiation in the reaction zone is readily controlled at all times and can be decreased or increased as the course of polymerization may require. Another serious problem encountered in high pressure polymerization heretofore has been the action of trace impurities in monomers which inhibit the polymerization to a marked extent. We have observed that our invention strongly reduces the effect of such trace impurities.

Pressures in the range of 20,000 to 40,000 pounds per square inch are satisfactory for most monomers, although if desired one can go even to much higher pressure, for example 200,000 pounds per square inch and higher. In view of the numerous monomers which can be polymerized in accordance with the invention it will be appreciated that optimum pressure to give a particular type of product will be found to vary considerably from one monomeric material to another. The same is true of reaction temperatures. Some monomers even under the action of gamma-radiation and high pressure, will not polymerize at a rate sufficient to be of practical interest at room temperature, and in such cases elevated temperatures are employed. The temperature is such as to give a useful but adequately controllable reaction rate. Too great a temperature in many instances results in lower molecular weight of the polymer and/or discoloration due to thermal degradation. By way of example in accordance with the invention, ethylene is polymerized at temperatures above 75° C. up to 250° C. or somewhat higher, while 1-chloro-1-fluoroethylene is polymerized at temperatures from well below 25° C. up to preferably not above 125° C. Choice of a desired temperature for a particular monomer or mixture of monomers will readily be made by those skilled in the art by simple testing, taking into consideration the reactivity of the monomer, type of product desired, and intensity of radiation available.

The reaction time will similarly be dependent upon the variables discussed hereinabove. The reaction time may range from a few minutes to a number of days. By way of example, we have obtained satisfactory conversions of ethylene to solid polyethylene in reaction times ranging from 5 hours to 280 hours in one type of equipment involving the treatment of a single batch of ethylene in a high pressure bomb under the influence of gama-radiation from a 50-millicurie cobalt-60 source.

It is preferred that the ionizing radiation be applied throughout the polymerization, and in many cases this is essential. However, some of the advantages of the invention are obtained when merely initiating the high pressure polymerization with ionizing radiation under conditions resulting in a continuation of the polymerization after the radiation is withdrawn, for example when catalysts are present in or formed in the reaction mixture. Intermittent polymerization is sometimes desirable and in some systems can be entirely controlled at will by insertion or withdrawal of the radiation source.

The following information is given only by way of example of individual monomers and types of monomers which can be polymerized in accordance with our invention. It is to be understood that a monomer can be subjected to what is termed a homopolymerization, meaning that its polymer contains only units of the single monomer, or can be subjected to polymerization in the presence of one or more other monomers (termed copolymerization) resulting in products containing units of more than one monomer in the polymer. The products of treating mixed monomers may be largely or entirely true copolymers wherein a single molecule is built up of units of each monomer, or may sometimes contain appreciable quantities of mixed homopolymers.

The process of this invention is of generic application to the addition polymerization and/or copolymerization of polymerizable compounds having the non-aromatic >C=C< group. Thus, it is applicable to monomeric unsaturated polymerizable compounds in which the unsaturation is due to a single terminal ethylenic group which is attached to a negative radical. It is thus applicable to polymerizable vinylidene compounds, including vinyl compounds. It is thus applicable to polymerizable acrylyl and alkacrylyl compounds. It is applicable to compounds having a single polymerizable non-terminal ethylenic group. Furthermore, it is applicable to polymerizable compounds having a plurality of ethylenic linkages of aliphatic character whether conjugated or isolated. A particularly preferred class is that of polymerizable unsaturated compounds wherein the carbon to carbon unsaturation consists in a terminal methylene, $CH_2$, joined by an ethylenic double bond to its neighboring carbon, i.e., consists in a $CH_2=C<$ group.

Compounds having a terminal methylene which are subject to polymerization and copolymerization by the process of this invention include those having one ethylenic unsaturation such as olefin hydrocarbons, e.g., ethylene, propylene, isobutylene, pentene-1; acrylyl and alkacrylyl compounds, e.g., acrylic, haloacrylic, and methacrylic acids, esters, nitriles, and amides—for example, acrylonitrile, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, aminoalkyl methacrylates such as $\beta$-diethylaminoethyl methacrylate, chloroethyl methacrylate, methacrylic acid, methacrylamide, ethyl acrylate, and α-chloroacrylic acid; vinyl and vinylidene halides, e.g., vinyl chloride, vinyl fluoride, vinylidene chloride, vinylidene fluoride, 1-fluoro-1-chloroethylene; vinyl carboxylates, e.g., vinyl acetate, vinyl trimethylacetate, vinyl hexanoate, vinyl laurate, vinyl chloroacetate, vinyl propionate, and vinyl stearate; N-vinyl imides, e.g., N-vinylphthalimide and N-vinylsuccinimide; N-vinyl lactams, e.g., N-vinylcaprolactam and N-vinylbutyrolactam; vinyl aryls, e.g., styrene, α-methylstyrene, chlorostyrenes and vinylnaphthalene; and other vinyl derivatives such as methyl vinyl ketone, vinylpyridine, 2-methyl-5-vinylpyridine, 2-vinylthiophene, vinylpyrrolidone, vinylcarbazole, vinyl isobutyl ether, and vinyl ethyl ether.

Polyfluoroethylenes of the general formula $CF_2=CXY$, wherein X is H, Cl, or F and Y is Cl or F, that may be employed alone or copolymerized with ethylene or other monomers include tetrafluoroethylene, chlorotrifluoroethylene, trifluoroethylene, and 1,1-dichloro-2,2-difluoroethylene.

Specific examples of copolymers obtained when the process of this invention is employed with mixtures of ethylenically unsaturated compounds include ethylene/vinyl chloride, ethylene/tetrafluoroethylene, vinyl chloride/vinylidene chlorofluoride, acrylonitrile/isobutylene, acrylonitrile/vinylpyridines, particularly those containing 2 to 10 percent of the vinylpyridine, isobutylene/vinylidene chloride, ethylene/vinyl acetate, isobutylene/vinyl acetate, vinyl acetate/allylidene diacetate, vinyl acetate/vinyl methyl ether, copolymers of monovinylacetylene with styrene, methyl methacrylate, and acrylonitrile and copolymers of methyl methacrylate containing up to 10 per cent of styrene, vinyl acetate, butyl methacrylate, acrylic esters, methacrylic acid, methacrylic anhydride, or ethylene glycol dimethacrylate.

Polymerizable compounds that have a plurality of ethylenic double bonds that may be polymerized or copolymerized include those having conjugated double bonds such as butadiene, 2-chlorobutadiene, 2-fluorobutadiene, 2-phenoxybutadiene, and isoprene, and compounds containing two or more ethylenic double bonds which are isolated with respect to each other. Compounds of the latter type include those having two or more ethylenic groups conjugated with a carboxylic group, e.g., methacrylic anhydride, acrylic and substituted acrylic esters of polyhydric alcohols such as ethylene glycol dimethacrylate, diethylene glycol dimethacrylate, triethylene glycol dimethacrylate, tetraethylene glycol dimethacrylate, diethylene glycol diacrylate, decamethylene glycol diacrylate, and glyceryl triacrylate, and mixtures of such esters, e.g., dimethacrylate esters of a mixture of polyethylene glycols. Compounds having one ethylenic group conjugated with a carboxylic group that may be employed include diallyl maleate, vinyl methacrylate, allyl methacrylate, crotyl methacrylate, methallyl methacrylate, and compounds which have no conjugation of the polymerizable ethylenic groups with carboxylic groups, including diallyl phthalate, diallyl carbonate, diallyl adipate, diallyl fumarate, divinyl succinate, divinyl adipate, and divinylbenzene.

While for the most part compounds which have a terminal methylene are preferred as polymerizable and copolymerizable monomeric compounds, other copolymerizable monomeric compounds include the fumaric pounds which are polymerizable include the fumaric esters. Fumaric and maleic acid derivatives are particularly valuable in the preparation of copolymers, thus maleic anhydride and dialkyl esters of fumaric and maleic acids, e.g., diethyl and dimethyl fumarate and maleate, may be copolymerized with ethylene, vinyl chloride or styrene by the process of this invention. Other copolymers thus obtainable include copolymers of ethylene, propylene, isobutylene, 2-ethylhexene-1, and mixed isobutylene/vinyl isobutyl ether with maleic anhydride; copolymers of isobutylene with vinyl acetate and dimethyl fumarate or dimethyl maleate; copolymers of allyl chloride with maleic anhydride; copolymers of styrene with maleic anhydride and the condensation product of maleic anhydride and ethylene glycol; and the copolymer of styrene with the condensation product of maleic anhydride and propylene oxide. Carbon monoxide, sulfur dioxide, and acetylene are likewise copolymerizable with ethylene by the process of this invention.

In addition to homopolymers and copolymers that may be obtained by the process of this invention, modified polymeric products may be obtained by carrying out the polymerization in the presence of materials which are non-polymerizable under the conditions employed but which combine with a plurality of units of the monomer. The products obtained by such a telomerization or chain transfer reaction, may be represented by the formula $Y(A)_nZ$, where A is a divalent radical formed from a polymerizable monomer such as ethylene, n is an integer of 2 to 50, or even higher, and Y and Z are fragments terminally attached to a chain of monomer units, which fragments form together a molecule of the non-polymerizable compounds such as halogenated compounds, e.g., carbon tetrachloride; acids, e.g., isobutyric acid and anhydride; esters, e.g., methyl propionate; acetals, e.g., dioxolane, mercaptans, bisulfites, alcohols, ethers, silicon halides, hydrogen chloride, and similar compounds. In a similar manner, hydrogen may be employed in the polymerization of ethylene to give a modified polyethylene.

Those skilled in the art will appreciate that the monomers and classes of monomers just named are not the only ones which can be polymerized in accordance with this invention, the two requirements being that a compound to be subjected to the process of this invention be (a) ethylenically unsaturated, and (b) polymerizable, since factors such as steric hindrance occasionally prevent a $>C=C<$ group from polymerizing in a particular molecule. It is also to be understood that all monomers included in the foregoing are by no means equivalent one to the other, for amongst the large variety of monomers great differences are found in ease of polymerization and the character of product obtainable. Monomers containing not over 30 carbon atoms per molecule are generally most useful. Although most ethylenically unsaturated compounds undergo homopolymerization, some do so only with great difficulty, if at all, yet readily enter into copolymerization reaction with other monomers. While almost any two or more ethylenically unsaturated monomers can be copolymerized, some mixtures undergo copolymerization with difficulty or only in certain proportions while others are readily copolymerizable in all proportions.

The term "polymerization" includes within its scope the polymerization of one monomer alone and the polymerization, i.e., copolymerization, of two or more monomers as well as the telomerization, i.e., polymerization in the presence of a chain transfer agent, of polymerizable monomers.

Among suitable reactants for our invention are the normally gaseous (i.e., gaseous at one atmosphere pressure and 70° F.) olefinic compounds, for example ethylene, 1-chloro-1-fluoroethylene, vinyl fluoride, vinylidene, trifluorochloroethylene, vinyl chloride. Polyvinyl fluoride, trifluorochloroethylene, vinyl chloride. Polyvinyl chloride made by our process has somewhat higher molecular weight than the ordinary polyvinyl chloride. Poly-1-chloro-1-fluoroethylene made by our process is tough and rubbery, has a high elasticity and a good adhesiveness to other surfaces. The practice of the invention greatly increases the rate of polymerization of most monomers.

Choice of suitable apparatus can readily be made by those skilled in the art taking into consideration the mechanical problems of irradiation, the necessity of avoiding too severe a heat build-up from the exothermic heat of polymerization, the strength of equipment required by high pressures, and the character of the polymer, i.e., whether the final reaction mixture is a readily flowable liquid or a viscous semi-liquid or solid. Batch polymerizations are perhaps the most convenient from the mechanical point of view. However, polymerizations effected by continuously flowing a reaction mixture through the reaction zone under the required conditions and for a length of time to obtain a desired conversion, have important advantages. Where solids are produced, and particularly where the percentage of conversion is quite high, it will often be desirable to include in the reaction mixture a non-polymerizable fluid, such as a carrying gas, or an organic liquid which either dissolves or merely suspends the polymer, or water. Of course where conversion is less than complete, unreacted monomeric material is recovered and recycled in known manner.

EXAMPLE 1

In obtaining the data reported hereinafter the following apparatus was used. The reactor was an electrically heated stainless steel bomb of 200 cc. capacity which was capable of withstanding a working pressure of 40,000 pounds per square inch. The bomb was fitted with an ⅛ inch inside diameter well, made of high pressure tubing, which passed through the center of the bottom closure and extended into the middle of the reaction space. Purpose of the well was to permit the cobalt-60 to be surrounded by materials being subjected to gamma-radiation. The cobalt-60 was in the form of thin wire encased in a 5-inch capsule which could be run in or out of the reactor by remote control. A lead shield was employed around the cobalt-60 when not in use. Constant temperature was maintained with a conventional controller and pressure was measured and followed by an automatic recorder. A high pressure pump provided monomer at any desired pressure up to 40,000 pounds per square inch. In order to minimize the possibility of experimental errors affecting results, the cobalt-60 reactor and the control bomb (similar in construction but without the well for the radioactive material) were connected to a common manifold and charged simultaneously from the same monomer source.

Results of ethylene polymerizations are reported in Table I.

obtained indicates that gamma-rays were effective in eliminating or reducing the effect of trace impurities which inhibit purely thermal polymerization.

Data are presented in the table for polymerization effects observed with ethylene held at 90° C. under pressure above 20,000 pounds per square inch, both in the presence and absence of gamma-rays. In all of these tests at 90° C. the polymer formed slowly but in good yield in bombs exposed to gamma-radiation, whereas conversion in control runs was limited to trace amounts of polymer representing yields much lower than 1 percent. Run G showed that thermal polymerization was pronounced at 115° C., and run H indicated that gamma-rays sharply accelerated polymer formation under the same conditions. Runs I and J showed the inhibitory effect of small amounts of impurities which got into the ethylene from new lines which had been placed in the ethylene supply system and further showed that the gamma-radiation was able to overcome the effect of said impurities and produce ethylene polymer.

In run K the ethylene contained 65 p.p.m. oxygen. Polymerization was proceeding at an appreciable rate at 90° C. in the presence of gamma-radiation when the temperature controller was reset to bring the reactor to 135° C. Before equilibrium temperature had been reached an explosive reaction took place. All previous work known to applicants on the production of polyethylene at high pressures had indicated that temperatures above about 155° C. were required for rapid oxygen-catalyzed polymerization of ethylene. This run represents the conjoint use of high pressures, gamma-radiation, and a deliberately added polymerization catalyst, i.e., oxygen.

EXAMPLE 2

A slightly modified procedure was employed in the run reported in Table II below wherein 1-chloro-1-fluoroethylene (also known as vinylidene chlorofluoride) was polymerized at 35,000 pounds per square inch (p.s.i.). The same apparatus was used as in Example 1. However, it was pressured with water, and the system was connected with an automatic pressure controller so that upon a 2,000 pounds per square inch pressure drop the reactor was automatically repressured to 35,000 pounds

*Table 1*

POLYMERIZATION OF ETHYLENE AT PRESSURES ABOVE 20,000 P.S.I. IN PRESENCE AND ABSENCE OF GAMMA-RAYS FROM COBALT-60 (50 millicuries)

| Run No. | Ethylene | Gamma-radiation | Conversion to polymer (percent) | Temp. (°C.) | Length of runs (hrs.) | Initial press. (p.s.i.) | Final press. (p.s.i.) | Remarks and observations |
|---|---|---|---|---|---|---|---|---|
| A | 2 p.p.m. O₂ | Yes | 95+ | 90 | 240 | 23,000 | 15,000 | Repressured several times with fresh ethylene. |
| B | 2 p.p.m. O₂ | No | <1 | 90 | 240 | 23,000 | 20,000 | Control run simultaneously with A. |
| C | 2 p.p.m. O₂ | Yes | 40 | 90 | 50 | 40,000 | 25,000 | Repressured once to 40,000. |
| D | 2 p.p.m. O₂ | No | <1 | 90 | 50 | 40,000 | 36,000 | Slight leak. Run simultaneously with C. |
| E | 1 p.p.m. O₂ | Yes | 23 | 90 | 26 | 27,000 | 18,000 | Polymer formed in hard ring around Cobalt-60 well. |
| F | 1 p.p.m. O₂ | No | 1 | 90 | 65 | 27,000 | 25,000 | Control for E, same reactor, system, and ethylene used as for E. |
| G | Highly purified 1 p.p.m. O₂.[1] | No | 42 | 115 | 19 | 29,000 | 15,000 | Maximum reaction speed after 5 hrs. with gradual slowing up for remainder of run. |
| H | ----do.[1] | Yes | 26 | 115 | 5 | 28,000 | 19,000 | Reaction almost explosive after 2 hrs. |
| I | Known to contain trace impurities. | Yes | 5 | 115 | 47 | 40,000 | 28,000 | Polymer yellowish. |
| J | Same as I | No | Nil | 115 | 96 | 32,000 | 30,000 | |
| K | 65 p.p.m. O₂ | Yes | 25 | 90–130 | 24 | 32,000 | Exploded | Repressured to 32,000 p.s.i. after 24 hrs. and heated to 130°; explosive reaction set in. |

[1] Oxygen-free so far as could be determined analytically.

Ethylene employed in the foregoing runs had been purified by low temperature fractional distillation and was of 99.9+ percent purity. An indication of purity is given for ethylene employed in each run.

Most of the runs were conducted at either 90 or 115° C. The 90° C. temperature was below that claimed by prior workers for thermal polymerization of ethylene, and the 115° C. temperature was found sufficient to complete polymerization at a suitably moderate rate. The evidence per square inch. Dropping pressure indicated polymerization was taking place. Constant pressure showed no reaction was occurring. This run showed that with the particular polymerization system, employing highly purified vinylidene chlorofluoride, polymerization took place only when the monomer was exposed to gamma-radiation. Ultimate conversion was 100 percent. Although we do not wish to be bound by any theory, we believe that practicing the invention in the presence of water may give rise to free radicals from the water which aid polymerization.

Table II

VINYLIDENE CHLOROFLUORIDE POLYMERIZATION

Operating pressure _____ 35,000 p.s.i.
Pressuring medium _____ Water.
Temperature _____ 50° C.

| Polymerization periods | Length of period, hr. | Position of, Co60 | Observations |
|---|---|---|---|
| First | 20 | Out | No pressure change after constant temperature reached. |
| Second | 8 | In | Pressure drop evident 15 min. after Co60 inserted. Steady drop continued until Co60 withdrawn. |
| Third | 43 | Out | No pressure drop evident during this interval. |
| Fourth | 21 | In | Pressure drop started immediately upon insertion of Co60. Steady drop until complete conversion to polymer was obtained after about 12 hrs. |

EXAMPLE 3

Copolymer of vinyl chloride and 1-chloro-1-fluoroethylene (also called vinylidene chlorofluoride) was prepared by the procedure and in the apparatus of Example 2. The reactor was charged with a mixture of 50 parts by weight vinyl chloride and 50 parts by weight vinylidene chlorofluoride, and brought to 50° C. under water pressure of 35,000 pounds per square inch. After 16 hours, the temperature was raised to 75° C. for the balance of the run. Polymerization was effected by exposing the monomeric material to gamma-radiation from the Co60 source. Essentially quantitative conversion to solid, homogeneous copolymer was obtained in 56 hours.

Energy Utilization

Calculations were made to show the efficiency of the present process in utilization of the radiation energy. These calculations are based upon several assumptions but each assumption has been conservative so that the $M/N$ or $G$ values obtained by calculation are unquestionably lower than the true values. From known information on the characteristics of the radiation and of the materials, the percentage of the total radiation energy absorbed by the reaction mixture was obtained. Thus, in the case of the run reported in Example 2 above, wherein 1-chloro-1-fluoroethylene was polymerized, it was assumed that a 1-inch blanket of the monomer surrounded the cobalt-60 source, from which it was calculated that the reaction mixture absorbed 16.1 percent of the total energy from the Co60. This figure is known to be low since part of the Co60 source was not actually covered by the monomer. The calculated minimum energy absorbed is equivalent to 478 roentgens per hour or 9,800 roentgens for the 20.5 hours of reaction time. The amount of product was 100 grams of polyvinylidenechlorofluoride. It was assumed that one ion pair formation occurred for each 33⅓ electron volts energy absorbed. This figure is based upon values generally reported for ionization of gases by ionizing radiations, but is not represented as being necessarily true since our reactants were in dense phase and actual quantitative determination of ion pair formation was not made. From these data, $M/N$ was calculated by common arithmetical procedure and the following value determined:

$$M/N = 4.88 \times 10^5$$

Since $G$ is the number of molecules reacted per 100 electron volts energy absorbed, and $M/N$ is the number of molecules reacted per ion pair theoretically produced based upon 33⅓ electron volts energy assumed absorbed per ion pair formation, $$G = M/N \times \frac{100}{33\frac{1}{3}} = 3(M/N)$$

Therefore, in the vinylidene chlorofluoride run of Example 2:

$$G = 1.464 \times 10^6$$

By similar calculations, the following data were obtained:

| | $M/N$ | M per hour |
|---|---|---|
| Example 1: | | |
| Run A | $3.86 \times 10^5$ | $8.97 \times 10^{21}$ |
| Run C | $7.42 \times 10^5$ | $1.72 \times 10^{22}$ |
| Run E | $8.20 \times 10^5$ | $1.90 \times 10^{22}$ |
| Run G | $4.83 \times 10^6$ | $1.12 \times 10^{23}$ |
| Run H | $4.88 \times 10^6$ | $3.74 \times 10^{22}$ |
| Example 2 | | |
| Example 3 | $2.14 \times 10^5$ | $1.53 \times 10^{22}$ |

As stated above, these values are to be considered as minima and the true values are appreciably greater.

While the invention has been described with particular reference to various preferred embodiments thereof, it will be appreciated that numerous modifications and variations are possible without departing from the invention.

We claim:

1. A process for producing normally-solid polymer products comprising subjecting reactants consisting essentially of polymerizable material selected from the class consisting of vinyl chloride, 1-chloro-1-fluoroethylene and mixtures of vinyl chloride and 1-chloro-1-fluoroethylene at a pressure of at least 5000 pounds per square inch to ionizing high-energy radiation of polymerizing intensity to produce a normally-solid polymer product.

2. A process of claim 1 wherein said material is 1-chloro-1-fluoroethylene and the temperature of polymerization is not more than 125° C.

3. A process of claim 2 wherein said pressure is at least 20,000 pounds per square inch and said radiation is gamma-radiation.

4. A process of claim 1 wherein said material is a mixture of vinyl chloride and 1-chloro-1-fluoroethylene and said pressure is at least 20,000 pounds per square inch.

References Cited in the file of this patent

UNITED STATES PATENTS

| | | |
|---|---|---|
| 1,961,493 | Hillis | June 5, 1934 |
| 2,350,330 | Remy | June 6, 1944 |
| 2,392,378 | Hanford | Jan. 8, 1946 |
| 2,577,133 | Ladd | Dec. 4, 1951 |

FOREIGN PATENTS

| | | |
|---|---|---|
| 282,096 | Switzerland | Apr. 15, 1952 |
| 309,002 | Great Britain | Apr. 2, 1929 |
| 982,840 | France | Jan. 31, 1951 |

OTHER REFERENCES

Davidson et al.: Journal of Applied Physics, volume 19 (May 1948), pages 427–433.

Schmitz et al.: Science, volume 113 (1951), pages 718–719.